United States Patent
Hwang et al.

(10) Patent No.: US 6,647,177 B1
(45) Date of Patent: Nov. 11, 2003

(54) COMPACT ADD-DROP MULTIPLEXER WITH LOW WAVELENGTH TEMPERATURE SENSITIVITY

(75) Inventors: Yu-Wen Hwang, Hsinchu (TW); Chih-Wei Huang, Taichung (TW); Jing-Tang Huang, Hsinchu (TW)

(73) Assignee: Browave Corporation, Hsin-Chu (TW)

( * ) Notice: Subject to any disclaimer, the term of this patent is extended or adjusted under 35 U.S.C. 154(b) by 0 days.

(21) Appl. No.: 10/307,353

(22) Filed: Dec. 2, 2002

(30) Foreign Application Priority Data

May 2, 2002 (TW) .......................... 91109166 A

(51) Int. Cl.[7] ................................ G02B 6/28
(52) U.S. Cl. ...................... 385/24; 385/31; 385/33; 385/60; 385/61
(58) Field of Search ..................... 385/24, 27, 31, 385/33, 34, 60, 61, 72, 74, 78, 79, 80

(56) References Cited

U.S. PATENT DOCUMENTS

| 5,778,118 A | * | 7/1998 | Sridhar | 385/24 |
| 5,889,904 A | * | 3/1999 | Pan et al. | 385/24 |
| 5,982,518 A | * | 11/1999 | Mizrahi | 398/84 |
| 6,023,542 A | * | 2/2000 | Pan et al. | 385/24 |
| 6,198,858 B1 | * | 3/2001 | Pan et al. | 385/24 |
| 6,249,625 B1 | * | 6/2001 | Pan | 385/43 |
| 6,339,663 B1 | * | 1/2002 | Leng et al. | 385/24 |

\* cited by examiner

Primary Examiner—Akm Enayet Ullah
Assistant Examiner—Jennifer Doan
(74) Attorney, Agent, or Firm—Birch, Stewart, Kolasch & Birch, LLP

(57) ABSTRACT

A compact add-drop multiplexer with low wavelength temperature sensitivity. In the present invention, a plurality of spacer rings is disposed between the optical elements of the add-drop multiplexer, and a heat curing epoxy or an ultraviolet curing epoxy adheres the optical elements to each other. The spacer rings are formed with a thermal expansion coefficient within a predetermined range to compensate for thermal stress of the WDM filter.

5 Claims, 3 Drawing Sheets

COMPACT ADD-DROP MULTIPLEXER WITH LOW WAVELENGTH TEMPERATURE SENSITIVITY

This nonprovisional application claims priority under 35 U.S.C. § 119(a) on patent application No. 091109166 filed in TAIWAN, R.O.C. on May 2, 2002, which is herein incorporated by reference.

BACKGROUND OF THE INVENTION

1. Field of the Invention

The present invention relates to an add-drop multiplexer for use in optical fiber technology, and particularly to a compact add-drop multiplexer with low wavelength temperature sensitivity.

2. Description of the Related Art

In recent years, the Internet has been widely developed, and requirement of network bandwidth, which relates to network connection speed, has largely increased. Presently, wavelength division multiplexing (WDM) technology is one of the most efficient and low-priced solutions for network bandwidth improvement. In WDM technology, an add-drop multiplexer composed of a WDM filter is widely used.

There are various conventional add-drop multiplexers. An example of the conventional add-drop multiplexer 1 is shown in FIG. 1. The conventional add-drop multiplexer 1 has a first glass ferrule 2, a pair of optical fibers 3a and 3b, a first GRIN lens 4, a WDM filter 5, a second GRIN lens 6, a second glass ferrule 7 and another optical fiber 3c.

In FIG. 1, the first glass ferrule 2 has a first hole 2a, with the optical fibers 3a and 3b disposed therein. Then, an adhesive, such as ultraviolet curing epoxy 8, is applied to fix an end 2b of the first glass ferrule 2 to an end 4a of the first GRIN lens 4 by adhering the edges of both the ends 2b and 4a together. Meanwhile, another adhesive, such as heat curing epoxy 9, is applied to adhere the WDM filter 5 to the other end 4b of the first GRIN lens 4. Further, Further the second glass ferrule 7 has a second hole 7a, with the optical fiber 3c disposed therein. Then, ultraviolet curing epoxy 8 is applied to fix an end 7b of the second glass ferrule 7 to an end 6a of the second GRIN lens 6 by adhering the edges of both the ends 7b and 6a together. Meanwhile, heat curing epoxy 9 is applied to adhere the WDM filter 5 to the other end 6b of the second GRIN lens 6.

However, in the above-mentioned add-drop multiplexer 1, the heat curing epoxy 8, when heated, is at a thin liquid state before curing and may permeate into the light path between the WDM filter 5 and the GRIN lens 4 and 6. Thus, the cured heat curing epoxy 8 blocks the light path, which leads to reduced signal intensity.

A further conventional compact add-drop multiplexer is disclosed to solve the above-mentioned problem. An example of the conventional compact add-drop multiplexer 100 is shown in FIG. 2. The conventional compact add-drop multiplexer 100 has a first glass ferrule 10, a first GRIN lens 20, a first spacer ring 31, a second spacer ring 32, a WDM filter 40, a second GRIN lens 25, a second glass ferrule 15, a third spacer ring 33 and a fourth spacer ring 34.

In FIG. 2, the first glass ferrule 10 has a first hole 11, with a pair of optical fibers 51 and 52 disposed therein. The second glass ferrule 15 has a second hole 16, with an optical fiber 53 disposed therein.

Then, an adhesive, such as heat curing epoxy 9, is applied to adhere the first spacer ring 31 to an end 21 of the first GRIN lens 20. Meanwhile, heat curing epoxy 9 is applied to adhere the first glass ferrule 10 to the first spacer ring 31. Similarly, heat curing epoxy 9 is also applied to adhere the second spacer ring 32 to the other end 22 of the first GRIN lens 20, and to adhere the WDM filter 40 to the second spacer ring 32. Thus, a clearance 70 exists between the first glass ferrule 10 and the first GRIN lens 20.

Similarly, heat curing epoxy 9 is applied to adhere the third spacer ring 33 to an end 26 of the second GRIN lens 25. Meanwhile, heat curing epoxy 9 is applied to adhere the second glass ferrule 15 to the third spacer ring 33. Similarly, heat curing epoxy 9 is also applied to adhere the fourth spacer ring 34 to the other end 27 of the second GRIN lens 25, and to adhere the WDM filter 40 to the fourth spacer ring 34. Thus, a clearance 71 exists between the second glass ferrule 15 and the second GRIN lens 25.

The spacer rings 31, 32, 33 and 34 applied in the compact add-drop multiplexer 100 are cannular, which prevents heat curing epoxy 9 from permeating the spaces between the WDM filter 40 and the GRIN lens 20 and 25 in the thin liquid state before curing. However, material of the spacer rings 31, 32, 33 and 34 is generally different from that of the WDM filter 40 and glass ferrules 10 and 15. It is multi-layer thin films deposited of the WDM filter 40 that determines the bandwidth of the bandpass central wavelength of the add-drop multiplexer. When the add-drop multiplexer with an ultra-narrow bandpass, such as an add-drop multiplexer with channel spacing of 50 GHz, is applied, the bandpass central wavelength of the add-drop multiplexer is greatly affected by the ambient temperature. Consequently, the ambient temperature affects the compact add-drop multiplexer 100 due to the material difference in the spacer rings and the optical elements.

The ambient temperature effect of the spacer rings 30 and the WDM filter 40 in the compact add-drop multiplexer 100 is hereinafter described with reference to FIG. 3. The WDM filter 40 has a multi-layer thin films deposited structure 41 on the substrate 42. There are three types of stress in the thin films structure, an inner stress due to thin films deposited structure itself, thermal stress due to thermal expansion coefficient of the substrate of the WDM filter, and thermal stress due to thermal expansion coefficient of the spacer rings. In FIG. 3, the spacer ring 30 is adhered to the WDM filter 40 by an adhesive, such as heat curing epoxy 9. Since the spacer ring 30 and the WDM filter 40 are of different materials, the thermal expansion coefficients of the spacer ring 30 and the WDM filter 40 are different, so that a compressive thermal stress 60 as shown in FIG. 3 or a tensive thermal stress may be obtained when the temperature changes. Thus, the thermal stress affects the bandpass central wavelength of the add-drop multiplexer, the so-called "temperature drifting effect."

SUMMARY OF THE INVENTION

In view of this, the present invention relates to a compact add-drop multiplexer with low wavelength temperature sensitivity, which reduces the temperature drifting effect in the conventional compact add-drop multiplexer by selecting spacer rings with a suitable thermal expansion coefficient to compensate for the thermal stress of the WDM filter.

The present invention discloses a compact add-drop multiplexer with low wavelength temperature sensitivity. The compact add-drop multiplexer has a first glass ferrule, a first GRIN lens, a second glass ferrule, a second GRIN lens, a WDM filter, and four spacer rings.

In the compact add-drop multiplexer of the present invention, the first glass ferrule is provided with a first hole and a pair of optical fibers disposed therein, and the second glass ferrule is provided with a second hole and an optical fiber disposed therein.

Further, the first GRIN lens has a first end corresponding to the first glass ferrule and a second end, and the second GRIN lens has a third end corresponding to the second glass ferrule and a fourth end. A first clearance is formed between the first glass ferrule and the first GRIN lens, and a second clearance is formed between the second glass ferrule and the second GRIN lens.

Further, the WDM filter is disposed between the second end of the first GRIN lens and the fourth end of the second GRIN lens.

Among the four spacer rings, the first spacer ring is provided between the first GRIN lens and the WDM filter by being adhered to the WDM filter and the second end of the first GRIN lens with an adhesive. The second spacer ring is provided between the second GRIN lens and the WDM filter by being adhered to the WDM filter and the fourth end of the second GRIN lens with the adhesive. The third spacer ring is provided between the first GRIN lens and the first glass ferrule by being adhered to the first glass ferrule and the first end of the first GRIN lens with the adhesive. The fourth spacer ring is provided between the second GRIN lens and the second glass ferrule by being adhered to the second glass ferrule and the third end of the second GRIN lens with the adhesive.

Specifically, the compact add-drop multiplexer of the present invention is characterized in that each spacer ring is formed with a thermal expansion coefficient within a predetermined range.

In the compact add-drop multiplexer of the present invention, it is preferable that the thermal expansion coefficient of each of the spacer rings is in a range of 3.0 to 25.0 ppm/° C. More specifically, the preferred thermal expansion coefficient of the spacer rings can be in a range of 9.0 to 12.0 ppm/° C. Further, the adhesive can be a heat curing epoxy or an ultraviolet curing epoxy.

BRIEF DESCRIPTION OF THE DRAWINGS

The present invention can be more fully understood by reading the subsequent detailed description in conjunction with the examples and references made to the accompanying drawings, wherein.

DETAILED DESCRIPTION OF THE INVENTION

The structure of the compact add-drop multiplexer with low wavelength temperature sensitivity of the present invention can be described in detail with reference to FIG. 2 and FIG. 4.

Figure 1:
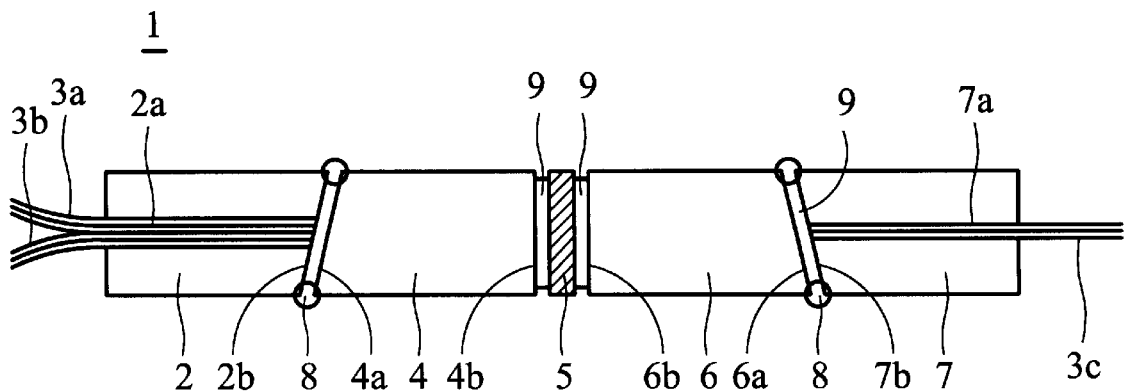
FIG. 1 is a schematic cross-section of a conventional add-drop multiplexer.
Figure 2:
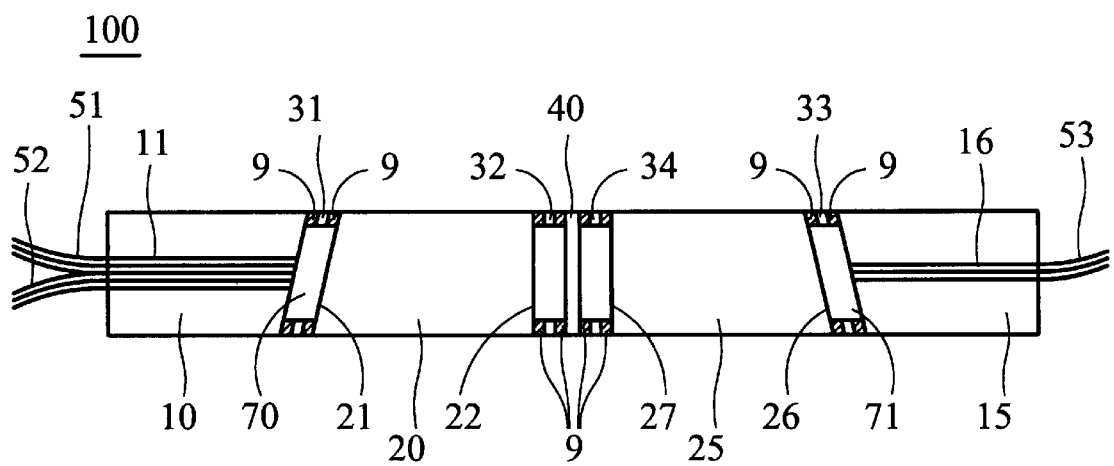
FIG. 2 is a schematic cross-section of a conventional compact add-drop multiplexer.
Figure 3:
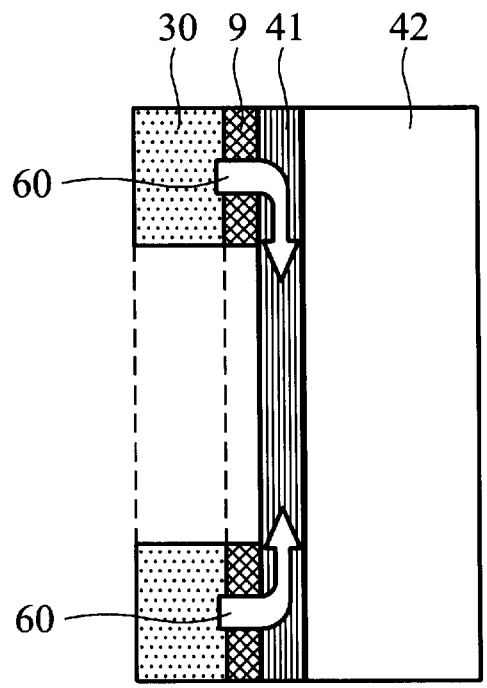
FIG. 3 is a schematic view showing the thermal stress of the spacer ring and the WDM filter of the conventional compact add-drop multiplexer.

The compact add-drop multiplexer of the present invention has a structure similar to the conventional compact add-drop multiplexer 100 in FIG. 2. The compact add-drop multiplexer has a first glass ferrule 10, a first GRIN lens 20, a first spacer ring 31, a second spacer ring 32, a WDM filter 40, a second GRIN lens 25, a second glass ferrule 15, a third spacer ring 33 and a fourth spacer ring 34.

The first glass ferrule 10 has a first hole 11, with a pair of optical fibers 51 and 52 disposed therein. The second glass ferrule 15 has a second hole 16, and an optical fiber 53 is disposed therein.

Then, an adhesive, such as heat curing epoxy 9 in FIG. 2 or the ultraviolet curing epoxy, is applied to adhere the first spacer ring 31 to an end 21 of the first GRIN lens 20. Meanwhile, heat curing epoxy 9 is applied to adhere the first glass ferrule 10 to the first spacer ring 31. Similarly, heat curing epoxy 9 is also applied to adhere the second spacer ring 32 to the other end 22 of the first GRIN lens 20, and to adhere the WDM filter 40 to the second spacer ring 32. Thus, a clearance 70 exists between the first glass ferrule 10 and the first GRIN lens 20.

Similarly, heat curing epoxy 9 is applied to adhere the third spacer ring 33 to an end 26 of the second GRIN lens 25. Meanwhile, heat curing epoxy 9 is applied to adhere the second glass ferrule 15 to the third spacer ring 33. Similarly, heat curing epoxy 9 is also applied to adhere the fourth spacer ring 34 to the other end 27 of the second GRIN lens 25, and to adhere the WDM filter 40 to the fourth spacer ring 34. Thus, a clearance 71 exists between the second glass ferrule 15 and the second GRIN lens 25.

Figure 4:
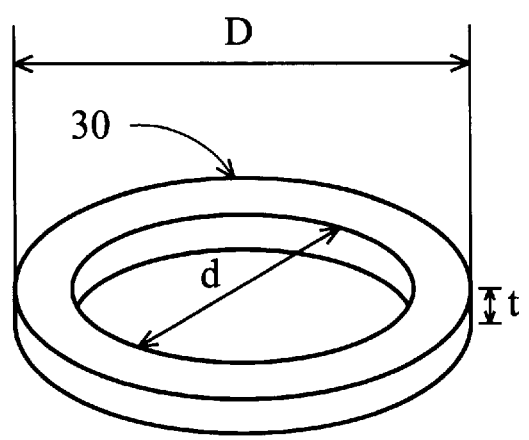
FIG. 4 is a schematic view showing a spacer ring of the compact add-drop multiplexer of the present invention.

Specifically, the compact add-drop multiplexer of the present invention is characterized by the spacer rings 30 shown in FIG. 4. The spacer rings 30 include the first spacer ring 31, the second spacer ring 32, the third spacer ring 33 and the fourth spacer ring 34. Each of the spacer rings 30 has a cannular ring shape or other cannular shape, with an external diameter D, an internal diameter d and a thickness t. Each of the spacer rings 30 is formed with a thermal expansion coefficient within a predetermined range, which is described hereinafter with reference to FIGS. 5A to 5D.

FIGS. 5A, 5B, 5C and 5D show embodiments of the bandpass central wavelength of the WDM filter related to the spacer rings with various thermal expansion coefficients of the present invention. In order to obtain the relation between the bandpass central wavelength $\lambda$ of the WDM filter and the ambient temperature as shown in the diagrams of FIGS. 5A to 5D, the spacer rings 30 of the add-drop multiplexer are applied as the operational factor of the embodiments.

Figure 5A:
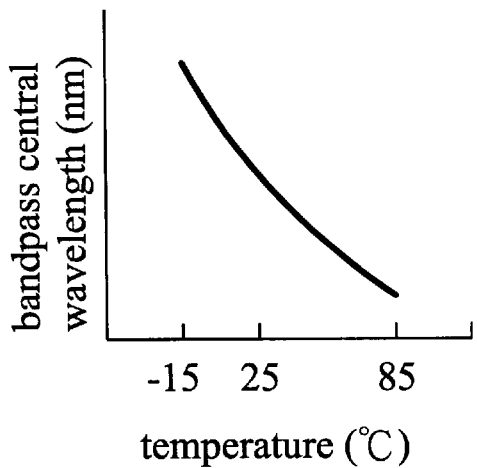
FIGS. 5A, 5B, 5C and 5D are diagrams showing embodiments of the bandpass central wavelength of the WDM filter related to the spacer rings with various thermal expansion coefficient of the present invention.

The spacer ring 30 of the embodiment in FIG. 5A has a large thermal expansion coefficient, such as a thermal expansion coefficient which exceeds 25.0 ppm/° C. It is obvious that when the ambient temperature increases, the bandpass central wavelength of the compact add-drop multiplexer "drifts" toward a shorter wavelength.

Figure 5B:
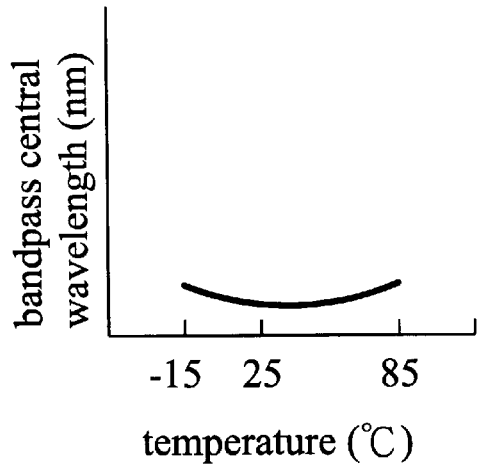

The spacer ring 30 of the embodiment in FIG. 5B has an moderate thermal expansion coefficient of 9.0 to 12.0 ppm/° C. The bandpass central wavelength of the compact add-drop multiplexer has a minimum value when the ambient temperature is set approximately to the room temperature. When the temperature increases or decreases, the bandpass central wavelength drifts slightly within a value of 0.0003 nm/° C. at the range of −50° C. to 70° C.

Figure 5C:
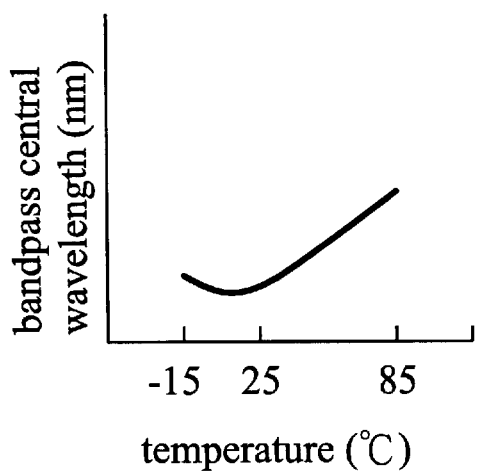

Further, the conventional add-drop multiplexer in which no spacer ring is applied is regarded in FIG. 5C as a contrast embodiment. It is obvious that when the ambient temperature increases, the bandpass central wavelength of the add-drop multiplexer drifts toward a longer wavelength within 0.003 to 0.01 nm/° C.

Figure 5D:
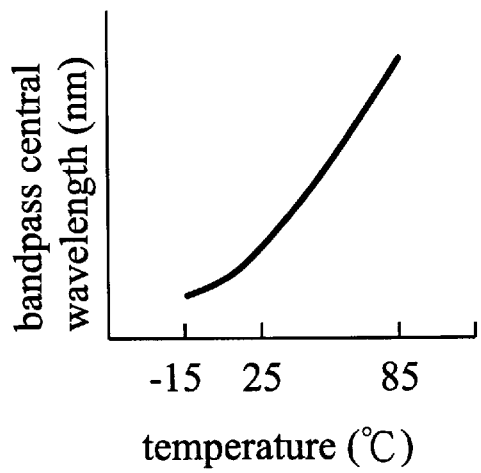

Further, the spacer ring 30 of the embodiment in FIG. 5D has a small thermal expansion coefficient, such as a thermal expansion coefficient which is approximately 3.0 ppm/° C. When the ambient temperature increases, the bandpass central wavelength of the add-drop multiplexer drifts rapidly toward a longer wavelength.

It should be noted that the WDM filter of the compact add-drop multiplexer of the present invention can be any suitable material. Consequently, since the thermal expansion coefficient of the WDM filter is generally set at a predetermined range, the spacer rings may preferably have the moderate thermal expansion coefficient of 9.0 to 12.0 ppm/° C. to reduce the temperature drifting effect of the compact add-drop multiplexer of the present invention. However, the thermal expansion coefficient of the spacer rings may be set to 3.0 to 25.0 ppm/° C. to obtain the compact add-drop multiplexer of the present invention with the temperature drifting effect reduced to an acceptable range.

While the present invention has been described with reference to the preferred embodiments thereof, it is to be understood that the invention is not limited to the described embodiments or constructions. On the contrary, the invention is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A compact add-drop multiplexer with low wavelength temperature sensitivity, comprising:

a first glass ferrule with a first hole and a pair of optical fibers disposed therein;

a first GRIN lens having a first end corresponding to the first glass ferrule and a second end, wherein a first clearance is formed between the first glass ferrule and the first GRIN lens;

a second glass ferrule with a second hole and an optical fiber disposed therein;

a second GRIN lens having a third end corresponding to the second glass ferrule and a fourth end, wherein a second clearance is formed between the second glass ferrule and the second GRIN lens;

a WDM filter disposed between the second end of the first GRIN lens and the fourth end of the second GRIN lens; and a first spacer ring provided between the first GRIN lens and the WDM filter adhered to the WDM filter and the second end of the first GRIN lens with an adhesive;

a second spacer ring provided between the second GRIN lens and the WDM filter adhered to the WDM filter and the fourth end of the second GRIN lens with the adhesive;

a third spacer ring provided between the first GRIN lens and the first glass ferrule adhered to the first glass ferrule and the first end of the first GRIN lens with the adhesive; and a fourth spacer ring provided between the second GRIN lens and the second glass ferrule adhered to the second glass ferrule and the third end of the second GRIN lens with the adhesive;

wherein the compact add-drop multiplexer is characterized by:

each of the four spacer rings being formed with a thermal expansion coefficient within a predetermined range, respectively.

2. The compact add-drop multiplexer with low wavelength temperature sensitivity according to claim 1, wherein the thermal expansion coefficient of each of the four spacer rings is in a range of 3.0 to 25.0 ppm/° C.

3. The compact add-drop multiplexer with low wavelength temperature sensitivity according to claim 1, wherein the thermal expansion coefficient of each of the four spacer rings is in a range of 9.0 to 12.0 ppm/° C.

4. The compact add-drop multiplexer with low wavelength temperature sensitivity according to claim 1, wherein the adhesive is a heat curing epoxy.

5. The compact add-drop multiplexer with low wavelength temperature sensitivity according to claim 1, wherein the adhesive is an ultraviolet curing epoxy.

* * * * *